UNITED STATES PATENT OFFICE.

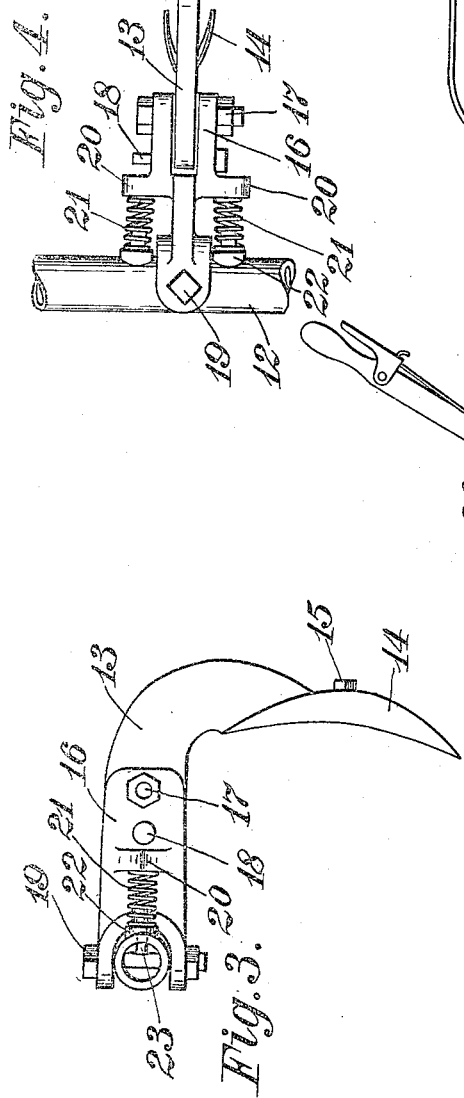
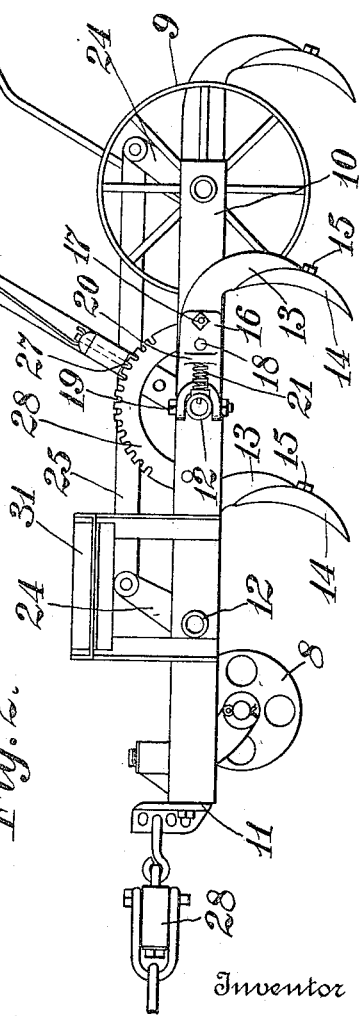

CLIFFORD H. PIDGEON, OF COLUMBUS, OHIO.

CULTIVATOR.

1,225,853.  Specification of Letters Patent.  Patented May 15, 1917.

Application filed September 13, 1915. Serial No. 50,326.

*To all whom it may concern:*

Be it known that I, CLIFFORD H. PIDGEON, a citizen of the United States, residing at Columbus, in the county of Franklin and State of Ohio, have invented a certain new and useful Improvement in Cultivators, of which the following is a specification.

For its thrifty growth it has been found that alfalfa needs cultivation several times during the year; but attempted cultivation with the means commonly employed has resulted in much damage to the fields. The injury to the plants is occasioned by the fact that alfalfa is sown quite thickly and its root develops a large crown so that the ordinary teeth of the harrow or cultivator drawn across the field lacerates the crowns and permits the setting up of a decay that eventually extends to the entire root. Alfalfa, therefore, is best cultivated by means which stir the soil between the crowns and roots of adjacent plants without cutting through them.

The object of the present invention is to provide an improved, simplified and cheapened construction of cultivator whereby alfalfa can be successfully cultivated in the manner stated and with a minimum of injury to the plants.

The invention is embodied in the example herein shown and described and then claimed at the end of the description.

In the accompanying drawings—

Fig. 2 is a side view.

Fig. 3 is a detail in side view of one of the cultivator teeth.

Fig. 4 is a top view of the construction shown in Fig. 3.

Figure 1:
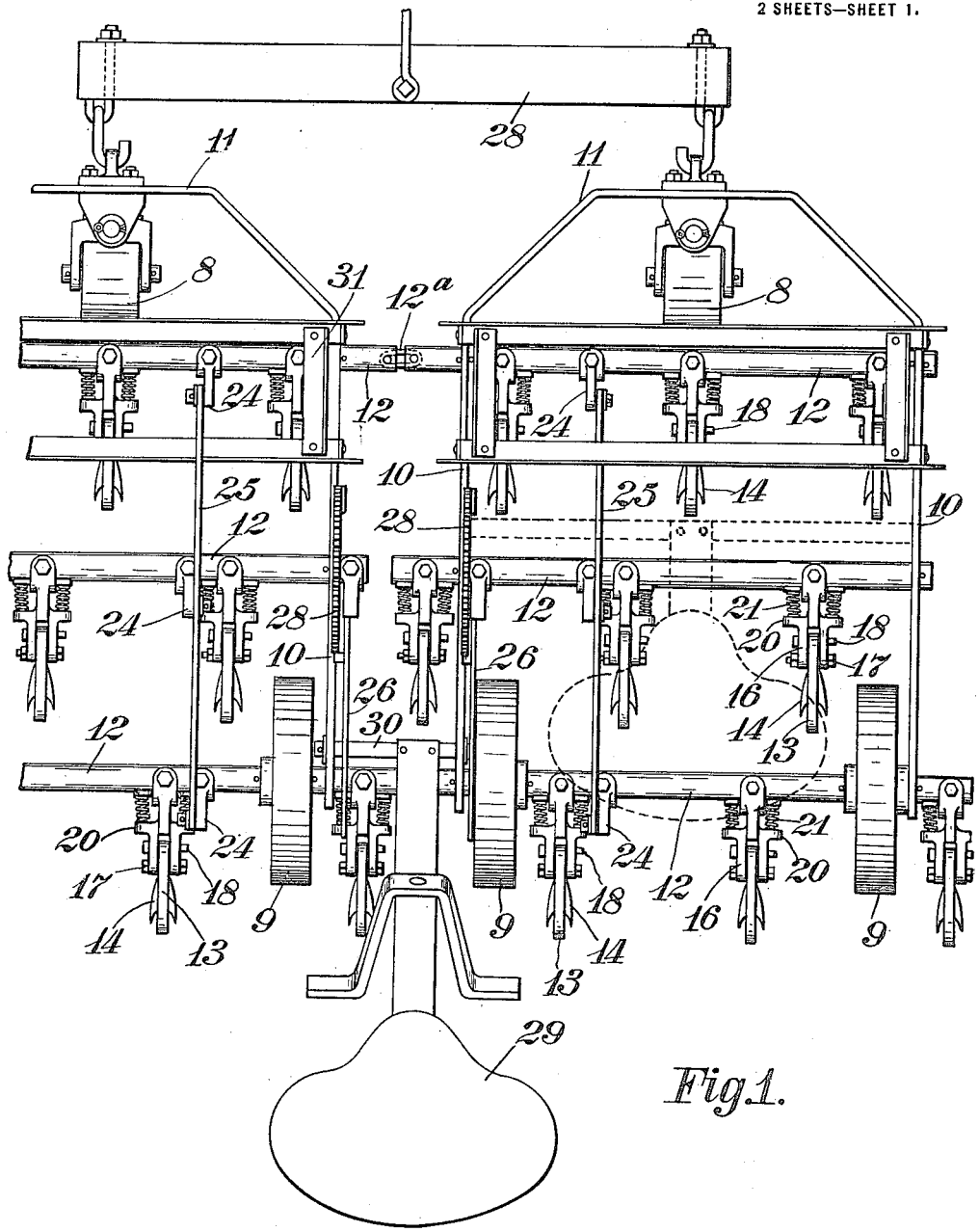
Figure 1 is a top plan view showing one complete cultivator section and part of another.

The cultivator can be made as a single structure or it can be composed of several similar sections or units united by flexible means. The main carrying frame includes side bars 10 united at the front by a suitable draw bar 11. Suitable forward and rear wheels 8 and 9 are provided for supporting the frame. Rockingly mounted in the side the frame. Rockingly mounted in the side bars transversely of the frame are several pipes or tubes 12 which have pins to prevent their endwise movement. These pipes or tubes carry the cultivator teeth.

Referring now more particularly to Figs. 3 and 4, 13 designates a tooth shank and 14 the tooth proper which is symmetrically formed from the middle of its length to both ends so as to be reversible. The tooth is suitably connected to the rear end of the shank 13 by a bolt and nut 15. The shank 13 is connected at its forward end with a bifurcated shank head or bracket 16 by means of a bolt and nut 17 but to fix the shank and tooth from movement with reference to the shank head or bracket I provide a frangible locking pin 18 passed through a hole in the head and shank. This locking pin 17 is conveniently made of wood.

The shank head or bracket 16 is pivoted to the pipe or tube 12 by means of a bolt and nut as seen at 19. Said shank head is also provided with socketed lateral extensions 20 to receive the ends of coil springs 21. The other or forward ends of the coil springs receive plugs 22 that have pins 23 to removably enter holes in the pipe 12. The construction is such that the springs are caused to stand in a position inclined toward each other at their rear ends so that when the tooth is swung to the right or left the spring at that side is compressed by pressure more nearly in the direction of its axis. The springs 21 should be made relatively light so that the tooth can be shifted to the right or left by a slight obstruction of the tooth, as for example the crown of an alfalfa root.

As shown in Figs. 1 and 2 the several pipes 12 have upwardly extending crank arms 24 connected by a bar 25 so that the rocking of one of the pipes causes a rocking of the others. The intermediate pipe 12 is provided with a handled lever 26 having a movable latch 27 to engage a toothed sector 28 on the side of the frame. By means of this construction all the pipes and the cultivator teeth which they carry can be raised or lowered and held in either position as desired. The cultivator teeth are located upon the pipes so as to occur in staggered arrangement and hence no two are, in operation, drawn in the same line.

Where the cultivator is made up of several sections such sections can be united at the sides by a flexible connection as for example a link 12ª held in the adjacent ends of two of the pipes in adjoining sections. Further where two sections or units are employed it is desirable that a single bar or tree 28 connecting the bars 11 be employed the draft animals being hitched to the one tree.

29 designates a seat for the driver. This is extended to the rear from a suitable connection 30 between the two units.

If desirable or necessary an auxiliary frame or cage 31 of angle bars can be provided at the forward portion of the cultivator to receive weights to counterbalance the weight of the driver. But where a single structure is employed the seat can be located over about the middle of the cultivator as indicated by broken lines at the right hand side of Fig. 1.

In practice the teeth are lowered by means of the lever 26 to the proper working depth according to conditions obtaining at the time required. As the cultivator is drawn forward the crowns of the alfalfa deflect the teeth to the right or left and instead of lacerating the crown they pass through the soil adjacent thereto. Should a tooth meet squarely a hard immovable obstruction the pin 17 is broken and the tooth permitted to deflect upward and pass over.

Within the limits of my claim or invention changes in the form can be made without departing from the scope thereof.

What I claim is:

In a cultivator, the combination of a frame containing a transverse horizontal rock shaft and means for latching the same in position, a cultivator tooth having a shank, a head with which said shank is connected, said head being pivoted directly to said rock shaft to oscillate horizontally, said head also provided with a lateral extension at each side thereof and a spring between each of said extensions and the rock shaft and operating directly thereon, substantially as shown and described.

CLIFFORD H. PIDGEON.

Copies of this patent may be obtained for five cents each, by addressing the "Commissioner of Patents, Washington, D. C."